(12) United States Patent
Liao et al.

(10) Patent No.: US 7,352,403 B2
(45) Date of Patent: Apr. 1, 2008

(54) METHOD FOR ADJUSTING RELATIVE POSITION OF LENS MODULE BY USING UNIFORM LIGHT SOURCE

(75) Inventors: Chih-Yu Liao, Taipei (TW); Jih-Yung Lu, Sanchong (TW)

(73) Assignee: Benq Corporation, Taoyuan (TW)

( * ) Notice: Subject to any disclaimer, the term of this patent is extended or adjusted under 35 U.S.C. 154(b) by 783 days.

(21) Appl. No.: 10/885,171

(22) Filed: Jul. 6, 2004

(65) Prior Publication Data
US 2005/0007482 A1    Jan. 13, 2005

(30) Foreign Application Priority Data
Jul. 7, 2003    (TW) .............................. 92118463 A

(51) Int. Cl.
*G03B 13/00* (2006.01)
*H04N 5/232* (2006.01)

(52) U.S. Cl. ...................... 348/350; 348/351; 348/187

(58) Field of Classification Search ................ 348/350, 348/351, 335, 187, 369, 208.7, 208.5, 208.11, 348/353, 354; 345/350, 351, 349; 250/201.2, 250/200; 353/100, 101
See application file for complete search history.

(56) References Cited

U.S. PATENT DOCUMENTS

| | | | | |
|---|---|---|---|---|
| 5,005,040 A | * | 4/1991 | Norita et al. | 396/96 |
| 5,218,395 A | * | 6/1993 | Taniguchi et al. | 396/99 |
| 5,534,923 A | * | 7/1996 | Suda | 348/354 |
| 6,377,305 B2 | * | 4/2002 | Onuki | 348/345 |

* cited by examiner

*Primary Examiner*—Ngoc-Yen Vu
*Assistant Examiner*—Peter Chon
(74) *Attorney, Agent, or Firm*—Snell & Wilmer L.L.P.

(57) ABSTRACT

A method for adjusting relative position of a lens module by using a uniform light source is provided. The lens module includes a bottom board, an image sensor, an adjusting module and a lens apparatus. The image sensor is disposed on the bottom board and perpendicular to the optical axis of the uniform light source. The lens apparatus is moveably disposed in front of the image sensor. The adjusting module connects the lens apparatus to the bottom board. The image sensor electrically connects to a testing module, and the testing module electrically connects to the adjusting module. The method includes: (a) receiving specific signals from the corresponding specific areas respectively; (b) processing the specific signals to determine an adjustment quantity; (c) selectively adjusting the relative position between the image sensor and the lens apparatus by adjusting the module according to the adjustment quantity.

18 Claims, 3 Drawing Sheets

METHOD FOR ADJUSTING RELATIVE POSITION OF LENS MODULE BY USING UNIFORM LIGHT SOURCE

CROSS-REFERENCE TO RELATED APPLICATIONS

This Application claims priority to Taiwan Patent Application No. 092118463 filed Jul. 7, 2003.

FIELD OF INVENTION

The present invention provides a method for adjusting the relative position of a lens module by using a uniform light source, and in particular, a method of adjusting a lens module of a digital camera assembly.

BACKGROUND OF THE INVENTION

A digital camera captures images by allowing the light from the image source to pass through the lens module, forming an image on the image sensor, such as a CMOS or CCD device, and transforming the image data into an electrical signal and storing it. Because the effective area of the image sensor is quite small, the optical axis should be aligned with the center of the image sensor and be perpendicular to the image sensor during the image formation process. For this reason, the appropriate alignment of the lens module with the center of the image sensor is key to ensuring good image quality.

The conventional method of the digital camera assembly is the locating method, for example, fix-hole fit or screw fit, by using components already available in the market. In addition to the position difference, the dimensional difference should also be considered in the total difference approximation. The differences accumulated during the assembly procedure may result in a total difference, which is greater than the tolerance, and therefore degrade the imaging quality of the digital camera.

To solve the problem of total difference control, the present invention provides a method of controlling the total difference effectively. By uniform light source testing before the final fixation of assembly, the total difference could be controlled effectively to ensure the imaging quality of the digital camera.

SUMMARY OF THE INVENTION

The present invention provides a method for adjusting the relative position of a lens module by using a uniform light source to control the total distance between an area on an image sensor and a lens structure.

The method of the present invention includes: (a) respectively receiving a first signal, a second signal and a third signal from a first area, a second area and a third area; (b) the test module processing the first signal, the second signal and the third signal respectively to determine an adjustment quantity; (c) based on the adjustment quantity, selectively adjusting the relative position between the image sensor and the lens apparatus through the adjustment module.

The assembly method of the present invention provides two major advantages in that it can reduce the time spent on adjusting each single component and ensure the imaging quality by placing the lens apparatus on the optimal position before the final assembly.

DETAILED DESCRIPTION

The present invention provides a method for adjusting the relative position of a lens module by using a uniform light source. The preferred embodiment of the present invention is applied to a digital camera, but the method can be applied to other apparatuses that require a lens module assembly.

Figure 1A:
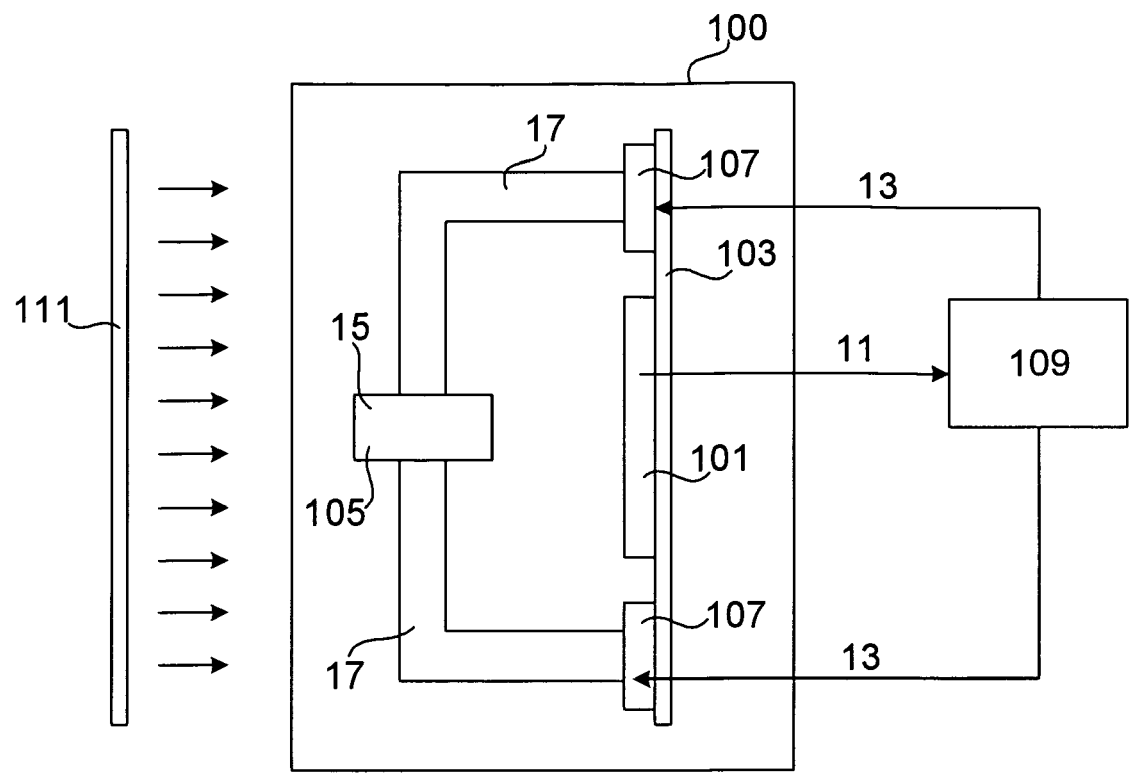
FIG. 1a shows a schematic diagram of the lens module of the present invention.
Figure 1B:
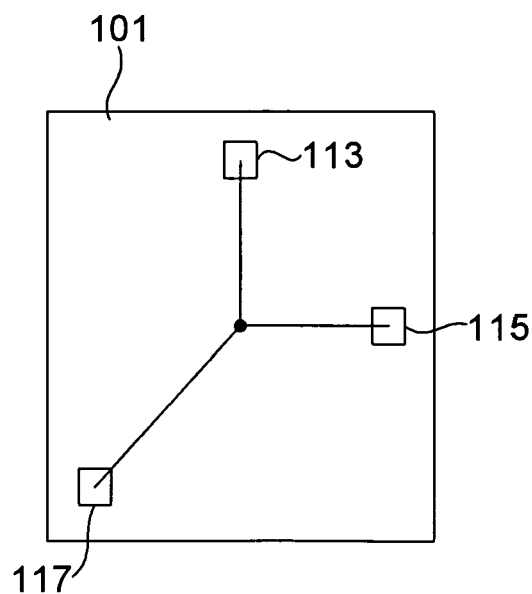
FIG. 1b shows a schematic diagram of the specific areas on the image sensor of the present invention.

FIG. 1a shows a schematic diagram of the lens module of the present invention. As shown in FIG. 1a, the lens module 100 includes an image sensor 101, a bottom board 103, a lens apparatus 105 and an adjustment module 107. The image sensor 101 is disposed on the bottom board 103 and perpendicular to an optical axis of the uniform light source 111. The image sensor 101 includes a plurality of pixels and at least three specific areas. Each specific area includes at least one pixel. As shown in FIG. 1b, the specific areas are a first area 113, a second area 115 and a third area 117. The specific areas receive the uniform light through the lens apparatus 105 and generate a specific signal 11. In the embodiment in FIG. 1b, the first area 113, the second area 115 and the third area 117 each generates a first signal, a second signal and a third signal, respectively. The specific signal 11 can be an illumination information in response to the illumination, or either a green-light signal, a red-light signal or a blue-light signal in response to the color of the light.

As shown in FIG. 1a, the lens apparatus 105 is connected to the bottom board 103 by the adjustment module 107, and the lens module 105 is movably disposed in front of the image sensor 101. The test module 109 electrically connects to the image sensor 101 and the adjustment module 107 respectively. The function of the test module 109 is to determine, based on the specific signal 11, whether the relative distance between the lens apparatus 105 and the image sensor 101 needs adjustment. If it needs to be adjusted, an adjustment quantity 13 is evaluated according to the specific signal 11 and transmitted to the adjustment module 107. The adjustment module 107 of the preferred embodiment of the present invention includes a screw set allowing two-dimensional adjustment. Screws in the screw set can be automatically or manually loosened or tightened to adjust the relative distance between the image sensor 101 and the lens apparatus 105.

Figure 2A:
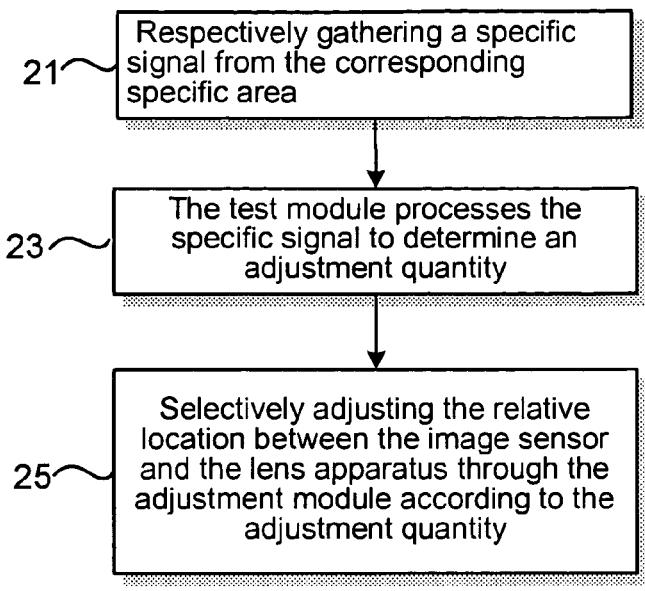
FIG. 2a shows a flow chart of the method for adjusting the relative position of a lens module by using a uniform light source.

As shown in FIG. 2a, the method of the present invention includes at least three steps. Step 21 is respectively receiving a specific signal 11 from the corresponding specific area. In step 23, the test module 109 processes the specific signal 11 to determine an adjustment quantity 13. Step 25 involves selectively adjusting the relative position between the image sensor 101 and the lens apparatus 105 through the adjustment module 107 according to the adjustment quantity 13.

Figure 2B:
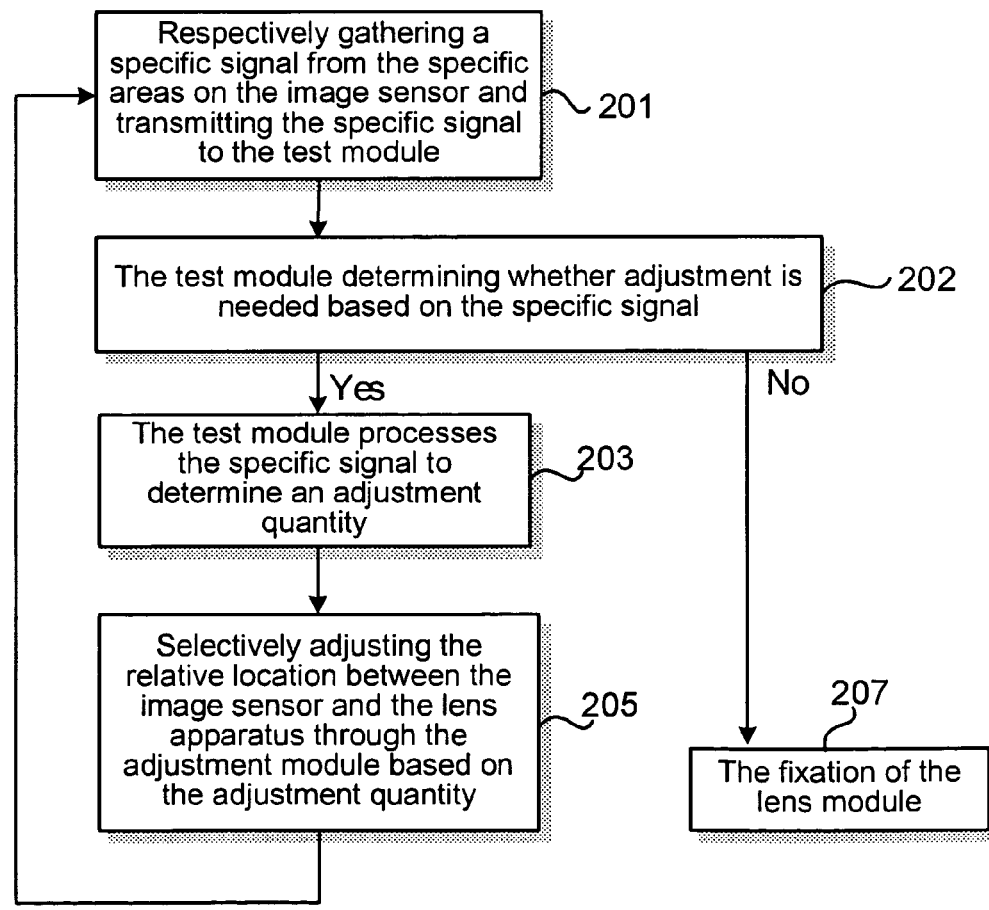
FIG. 2b shows a flow chart of another embodiment of the present invention.

FIG. 2b shows a flow chart of another embodiment of the present invention. In this embodiment, the lens module 100 is assembled before adjustment and a uniform light source 111 is turned on so that the image sensor 101 receives the uniform light through the lens apparatus 105. As shown in FIG. 2b, step 201 is respectively receiving a specific signal 11 from the specific areas on the image sensor 101 and transmitting the specific signal 11 to the test module 109. Step 202 involves the test module 109 determining whether adjustment is needed based on the specific signal 11. When the absolute value of the difference between the maximum value and the minimum value of the specific signal 11 is less than a tolerance generated based on experience or production cost, adjustment is not necessary and step 207 can be carried out directly. On the other hand, if the absolute value of the difference between the maximum value and the minimum value of the specific signal 11 is greater than the tolerance, then adjustment is needed and step 203 should be carried out. In step 203 the test module 109 processes the specific signal 11 to determine an adjustment quantity 13. Step 205 involves selectively adjusting the relative position between the image sensor 101 and the lens apparatus 105 through the adjustment module 107 based on the adjustment quantity 13. After step 205, step 201 should be repeated. If the criterion in step 202 is met, the fixation of the lens module 100 in step 207 can be carried out. In other embodiments, the fixation can be done right after step 205.

Figure 3A:
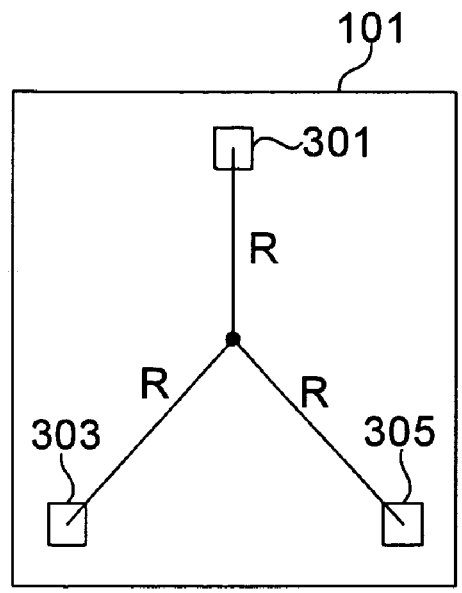
FIG. 3a shows a schematic diagram of the embodiment of the specific areas on the image sensor.

FIG. 3a shows a schematic diagram of the embodiment of the specific areas on the image sensor. In this embodiment, the specific areas are a first area 301, a second area 303 and a third area 305, each having the same distance to the geometric center of the image sensor 101. After the image sensor 101 receives the uniform light through the lens apparatus 105, the first signal, the second signal and the third signal are generated by the first area 301, the second area 303 and the third area 305 respectively and transmitted to the test module 109. If the relative position between the image sensor 101 and the lens apparatus 105 is appropriate, the first signal, the second signal and the third signal should have the same value. If the difference between those signals is too significant, adjustment should be made. In the preferred embodiment, a tolerance is determined based on experience or production cost, and adjustment is to be made when the difference between the maximum value and the minimum value of those signals exceeds the tolerance. The adjustment quantity 13 is evaluated according to the difference of either two of the first signal, the second signal and the third signal. As shown in FIG. 3a, the first signal and the second signal are chosen for comparison first. If the first signal is greater than the second signal, it indicates that the relative distance between the first area 301 and the lens apparatus is shorter and that adjustment is needed. The adjustment involves rotating the image sensor 101, with the use of the adjustment module 107, around an axis that lies on the same plane on which the image sensor 101 is placed and is perpendicular to the line connecting the first area 301 to the second area 303. Following the aforementioned method, another set of signals is compared and the adjustment quantity 13 of another rotation dimension can be obtained. By making two-dimensional adjustment until the tolerance criterion is met, it can be ensured that the image sensor 101 and the lens apparatus 105 are in the appropriate relative position.

Figure 3B:
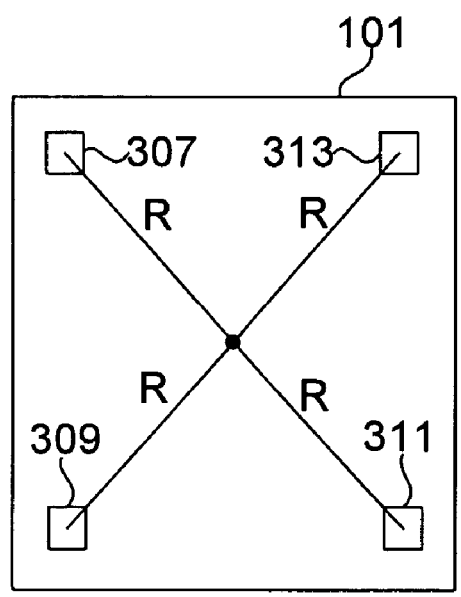
FIG. 3b shows a schematic diagram of another embodiment of the specific areas on the image sensor.

FIG. 3b shows a schematic diagram of another embodiment of the specific areas on the image sensor. In this embodiment, the specific areas are a first area 307, a second area 309, a third area 311 and a fourth area 313, each with the same distance to the geometric center of the image sensor 101, wherein the line connecting the first area 307 to the third area 311 and the line connecting the second area 309 to the fourth area 313 are perpendicular to each other and intersect at the geometric center of the image sensor 101. After the image sensor 101 receives the uniform light through the lens apparatus 105, the first signal, the second signal, the third signal and the fourth signal are generated by the first area 307, the second area 309, the third area 311 and the fourth area 313 respectively and transmitted to the test module 109. If the relative position between the image sensor 101 and the lens apparatus 105 is appropriate, the first signal, the second signal, the third signal and the fourth signal should have the same value. If the difference between those signals is too significant, then adjustment is needed. The preferred embodiment is to determine a tolerance based on experience or production cost, and make adjustment when the difference between the maximum value and the minimum value of those signals is greater than the tolerance. The adjustment quantity 13 is evaluated according to the difference between either two of the first signal, the second signal, the third signal and the fourth signal. As shown in FIG. 3b, the first signal and the third signal are chosen for comparison first. If the first signal is greater than the second signal, it indicates that the relative distance between the first area 307 and the lens apparatus 105 is shorter and that adjustment is needed. The adjustment involves rotating the image sensor 101, with the use of the adjustment module 107, around an axis that lies on the same plane on which the image sensor 101 is placed and is perpendicular to the line connecting the first area 307 to the third area 311. Following the same method, the second signal and the fourth signal are compared and the adjustment of another dimension is made to ensure that the image sensor 101 and the lens apparatus 105 are in the appropriate relative position. The specific areas are disposed in the four corners of the image sensor 101 respectively and the rotation axes of the two-dimension adjustment are fixed, which can reduce testing time and facilitate automatic production.

The lens apparatus 105 includes a lens set 15 and an assembly module 17, wherein the lens set 15 includes at least one lens. The assembly module 17 is adjustably connected with the lens set 15 and the bottom board 103 by the adjustment module 107.

While the invention has been described in connection with what is presently considered to be the most practical and preferred embodiments, it is to be understood that the invention is not to be limited to the disclosed embodiments. The invention is intended to cover various modifications and equivalent arrangement included within the spirit and scope of the appended claims.

We claim:

1. A method for adjusting a relative position of a lens module by using a uniform light source, the lens module including a bottom board, an image sensor, an adjustment module and a lens apparatus, the image sensor being disposed on the bottom board and perpendicular to an optical axis of the uniform light source, the image sensor including a plurality of pixels, the image sensor further including a first area, a second area and a third area, the first area, the second area and the third area including at least one pixel respectively, the lens apparatus being movably disposed in front of the image sensor, the lens apparatus being connected to the bottom board by the adjustment module, the image sensor electrically connecting to a test module, the test module electrically connecting to the adjustment module, the method comprising:

respectively receiving a first signal, a second signal and a third signal from the first area, the second area and the third area;

the test module processing the first signal, the second signal and the third signal respectively to determine an adjustment quantity; and selectively adjusting the relative position between the image sensor and the lens apparatus through the adjustment module according to the adjustment quantity, wherein the first area, the second area and the third area have a same distance to a geometric center of the image sensor respectively.

2. The method of claim 1, wherein the adjustment quantity is calculated according to a difference between two of the first signal, the second signal and the third signal.

3. The method of claim 2, wherein when the difference is larger than a tolerance, the adjustment module makes an adjustment according to the adjustment quantity.

4. The method of claim 1, wherein the adjustment quantity is calculated according to a difference between a minimum value and a maximum value among the first signal, the second signal and the third signal.

5. The method of claim 1, wherein the adjustment module adjusts the relative position between the image sensor and the lens apparatus by two-dimensional rotation on a plane.

6. The method of claim 1, wherein the lens apparatus includes a lens set and an assembly module for adjustably connecting the lens set to the bottom board.

7. The method of claim 1, wherein the adjustment module includes a screw set allowing two-dimensional adjustment.

8. The method of claim 1, wherein the first signal, the second signal and the third signal include an illumination information respectively.

9. The method of claim 1, wherein the first signal, the second signal and the third signal include a green-light signal respectively.

10. A method for adjusting relative position of a lens module by using a uniform light source, the lens module including a bottom board, an image sensor, an adjustment module and a lens apparatus, the image sensor being disposed on the bottom board and perpendicular to the optical axis of the uniform light source, the image sensor including a plurality of pixels, the image sensor further including a first area, a second area, a third area and a fourth area, the first area, the second area, the third area and the fourth area including at least one pixel respectively, the lens apparatus being movably disposed in front of the image sensor, the lens apparatus being connected to the bottom board by the adjustment module, the image sensor electrically connecting to a test module, the test module electrically connecting to the adjustment module, the method comprising:

respectively receiving a first signal, a second signal, a third signal and a fourth signal from the first area, the second area, the third area and the fourth area;

the test module processing the first signal, the second signal, the third signal and the fourth signal respectively to determine an adjustment quantity; and selectively adjusting the relative position between the image sensor and the lens apparatus through the adjustment module according to the adjustment quantity, wherein the first area, the second area, the third area and the fourth area have a same distance to a geometric center of the image sensor respectively; and the adjustment quantity is calculated according to a difference between a minimum value and a maximum value among the first signal, the second signal, the third signal and the fourth signal.

11. The method of claim 10, wherein the first area and the third area define a first line passing through a geometric center of the image center, and the second area and the fourth area define a second line passing through the geometric center of the image center, and the first line is perpendicular to the second line.

12. The method of claim 10, wherein the adjustment quantity is calculated according to a difference between the first signal and the third signal.

13. The method of claim 10, wherein when the difference is larger than a tolerance, the adjustment module makes an adjustment according to the adjustment quantity.

14. The method of claim 10, wherein the adjustment quantity is calculated according to a difference between two of the first signal, the second signal, the third signal and the fourth signal.

15. The method of claim 14, wherein when the difference is larger than a tolerance, the adjustment module makes an adjustment according to the adjustment quantity.

16. The method of claim 10, wherein the adjustment module adjusts the relative position between the image sensor and the lens apparatus by two-dimensional rotation on a plane.

17. The method of claim 10, wherein the lens apparatus includes a lens set and an assembly module, adjustably connecting the lens set to the bottom board.

18. The method of claim 10, wherein the adjustment module includes a screw set providing two-dimensional adjustment.

* * * * *